(12) United States Patent
Heinlein

(10) Patent No.: US 11,851,826 B2
(45) Date of Patent: Dec. 26, 2023

(54) SUBSURFACE WARMING SYSTEM FOR AN ATHLETIC FIELD

(71) Applicant: Technology Licensing Corp., Cincinnati, OH (US)

(72) Inventor: Mark Heinlein, Cincinnati, OH (US)

(73) Assignee: Technology Licensing Corp., Cincinnati, OH (US)

( * ) Notice: Subject to any disclaimer, the term of this patent is extended or adjusted under 35 U.S.C. 154(b) by 137 days.

(21) Appl. No.: 17/577,074

(22) Filed: Jan. 17, 2022

(65) Prior Publication Data

US 2022/0228325 A1   Jul. 21, 2022

Related U.S. Application Data

(60) Provisional application No. 63/138,663, filed on Jan. 18, 2021.

(51) Int. Cl.
*E01C 13/02* (2006.01)
*E01C 13/08* (2006.01)

(52) U.S. Cl.
CPC ............ *E01C 13/02* (2013.01); *E01C 13/083* (2013.01)

(58) Field of Classification Search
CPC ........ E01C 13/02; E01C 13/083; E01C 13/08; E01C 11/26; E02B 11/00; A01G 25/06; Y10T 137/1866
See application file for complete search history.

(56) References Cited

U.S. PATENT DOCUMENTS

| 4,268,993 A | 5/1981 | Cunningham |
| 5,120,158 A * | 6/1992 | Husu ...................... E01C 13/02 |
| | | 405/36 |

(Continued)

FOREIGN PATENT DOCUMENTS

| EA | 032278 B1 * | 5/2019 | |
| EP | 3002369 A1 * | 4/2016 | .............. C09J 11/06 |

(Continued)

OTHER PUBLICATIONS

US Patent and Trademark Office, International Search Report and Written Opinion of PCT/US22/12111, dated Apr. 1, 2022, Alexandria, VA. United States.

(Continued)

*Primary Examiner* — Abigail A Risic
(74) *Attorney, Agent, or Firm* — Wood Herron & Evans LLP

(57) ABSTRACT

A subsurface warming system for an athletic field supplies positive pressurization to a particulate subsurface via a piping network with pipes that have openings. The system enables control of the temperature of the supplied air by varying the flow resistance at an output end of a constant air supply source, such as a positive displacement blower. By increasing the flow resistance at the output end of the blower, with a variably controllable valve equipped with a modulating actuator, the operating temperature of the blower increases and thereby causes a corresponding increase in the temperature of the air supplied therefrom. By varying the flow resistance, as needed, a user can vary the temperature of the air supplied to the piping network and eventually to the subsurface, to allow the problem associated with freezing of the subsurface during the winter season, for an athletic field that may be an artificial turf.

24 Claims, 6 Drawing Sheets

(56) References Cited

U.S. PATENT DOCUMENTS

| | | | | |
|---|---|---|---|---|
| 5,368,092 | A | * | 11/1994 | Rearden .................. E01C 13/02 165/45 |
| 5,507,595 | A | * | 4/1996 | Benson .................. A01G 25/06 47/1.01 R |
| 5,636,473 | A | * | 6/1997 | Benson .................. E01C 13/083 47/1.01 R |
| 5,944,444 | A | * | 8/1999 | Motz ..................... E01C 13/083 405/36 |
| 6,088,959 | A | * | 7/2000 | Wait ..................... E01C 13/083 47/2 |
| 8,678,706 | B2 | * | 3/2014 | Luciano, Jr. ........... A01G 17/06 137/340 |
| 10,577,755 | B1 | * | 3/2020 | Mikkelson ........... A01G 25/167 |
| 10,975,534 | B1 | * | 4/2021 | Mikkelson ............. E01C 13/02 |
| 2007/0237583 | A1 | * | 10/2007 | Corwon .................. E01C 13/02 405/37 |
| 2014/0352729 | A1 | | 12/2014 | Happel |

FOREIGN PATENT DOCUMENTS

| | | | | |
|---|---|---|---|---|
| KR | 20010020553 | A | * | 3/2001 |
| WO | WO-9625035 | A1 | * | 8/1996 ............. E01C 13/02 |
| WO | WO-2022155196 | A1 | * | 7/2022 ............. E01C 13/02 |

OTHER PUBLICATIONS

US Patent and Trademark Office, International Preliminary Report on Patentability in PCT Application No. PCT/US2022/012111, dated Jul. 27, 2023 (7 pgs.).

* cited by examiner

SUBSURFACE WARMING SYSTEM FOR AN ATHLETIC FIELD

RELATED APPLICATION

This application claims priority to U.S. Provisional Patent Application Ser. No. 63/138,663, filed on Jan. 18, 2021, entitled "Root Zone Warming System For Natural Turf Athletic Field," which is expressly incorporated by reference herein, in its entirety.

FIELD OF THE INVENTION

This invention relates to a method and system for warming the subsurface of an athletic field. If the athletic field is natural grass, then this invention relates to warming the root zone of the natural turf, to buffer the root zone temperature and thereby reduce the onset, the degree, or the duration of dormancy during the winter season. If the athletic field is an artificial turf, then this invention reduces the onset, the degree, or the duration of freezing that may otherwise occur during the winter.

BACKGROUND OF THE INVENTION

Over the years there have been a number of technical developments that have enhanced the performance of natural turf, particularly natural turf used as part of an athletic field, or athletic playing surface.

For example, Daniel et al. U.S. Pat. No. 3,908,385, issued Sep. 30, 1975 and entitled "Planted Surface Conditioning System," discloses a natural turf athletic field equipped with a drainage system that includes vacuum to promote enhanced drainage of water from the natural turf. This vacuum-enhanced drainage feature enables the natural turf to be playable sooner after a downpour, or even during a downpour, by pulling moisture from the natural turf much faster than would otherwise occur via mere gravity drainage. Given the prevalence at that time of short-pile artificial turf, often referred to as "Astroturf," this feature better enabled natural turf to compete with such then-new artificial turf systems.

In general, this type of system included a water impermeable membrane over a compacted subsurface, covered by a fill layer of sand with a drainage network buried therein and a natural turf playing surface above the fill layer. The roots of the natural turf extend downwardly into the fill layer, to create a subsurface root zone. Some of the pipes in the drainage network include openings to accommodate gravity drainage and also vacuum-enhanced drainage. As a pioneer in the technology related to natural turf athletic fields, Dr. Daniel recognized the advantages that could be achieved by using a uniform subsurface particulate for a natural grass athletic field, how the uniformity of the particulate material enhanced the consistency of drainage and sub-irrigation, and also how it complemented the capability for vacuum-enhanced drainage.

Thereafter, Dr. Daniel developed an improvement to his original system, as taught in U.S. Pat. No. 5,350,251, issued Sep. 27, 1994 and entitled "Planted Surface Moisture Control System." The system disclosed in the '251 patent reduced the installation and construction costs associated with incorporating vacuum-enhanced drainage into a natural turf athletic field, primarily by eliminating the need for underground concrete vacuum pump pits. This reduction in costs made the vacuum-enhanced drainage feature more widely available for natural turf athletic fields, and thereby also increased the availability of natural turf athletic fields.

The present applicant has successfully practiced the technology taught in the Daniel '385 and '251 patents, primarily under the trademarks "PRESCRIPTION ATHLETIC TURF," or "PAT." Moreover, as disclosed in U.S. Pat. No. 5,752,784, entitled "Low Profile Drainage Network For Athletic Field Drainage System" and U.S. Pat. No. 5,944,444, entitled "Control System For Draining, Irrigating and Heating An Athletic Field," applicant has improved upon this technology. More specifically, the 784 patent discloses the use of low profile couplings in the subsurface piping network, at each intersection of a low profile conduit row and a lower level pipe row, with all of the low profile conduits and the lower level pipes residing above a water impermeable barrier. These low profile couplings reduced the overall vertical profile of the athletic field, and thereby reduced the overall amount of fill layer material needed, and the corresponding costs. The low profile couplings also simplified the subsurface work, because in such a system all of the trenches for the piping network are parallel, for the lower level pipe rows, and there are no perpendicular trenches needed.

Further, the 784 patent discloses the use of multiple subsurface water level sensors that measure the actual physical level of the water above the membrane. This improved the overall reliability of the system with respect to water level sensing, and thereby facilitated further automation of the system controls, particularly with respect to the vacuum-enhanced drainage feature.

Thereafter, the '444 patent disclosed the use of a remote computer to control such a system, and also added a subsurface feature that involved the flowing of heated water, from a heat exchanger, between adjacently located subsurface sections of the field. The subject matter of each of the 784 and '444 patents is expressly incorporated by reference herein, in its entirety.

Subsequently, as shown in German Utility Model DE 29903998 U1, systems were developed to push air into an athletic field from below, using the same subsurface piping network that is used for drainage. As disclosed in this publication, the system includes a fan that generates the air that is blown to the subsurface. While enroute to the subsurface piping network, the blown air moves through a heat exchanger that is operatively connected to a burner, or furnace, such that the air becomes warmed before it reaches the subsurface of the field. U.S. Pat. No. 7,413,380 discloses this same general concept, in the context of a system and method for conditioning the natural turf of golf course greens. Moving warmed air into the subsurface root zone of a natural turf has the potential for reducing the time period when the roots are dormant, during the winter months.

In more recent years applicant has also continued its efforts to improve upon the concepts and features initially devised by Dr. Daniel, by designing and installing natural turf athletic fields with gravity drainage, vacuum-enhanced drainage, irrigation (including subsurface irrigation) and positive pressurization to aerate the athletic field. In one instance applicant also used a subsurface heat exchanger that was based on geothermal principles to warm the air supplied to the subsurface of the athletic field for aeration, to warm the root zone of the natural grass.

One less than optimal aspect of this particular structure is that the pressurizing air always must flow through the heat exchanger, even when there is no need to warm the air flow. For some relatively temperate climates, where the warming feature is largely unused, the heat exchanger represents added structure that is mostly unneeded, yet nonetheless still needs to be maintained.

Other field installers have also incorporated the use of positive pressurization into their athletic field systems, to push air into the subsurface root zone of a natural turf field through a subsurface piping network, and then upwardly to atmosphere. For some of these other known systems this aeration feature includes generating the air flow with a large fan, and then directing the air through a furnace before routing it to the piping network.

Such systems present some significant practical disadvantages. For instance, such systems require a significant amount of floor space and ceiling height, due to the space requirements of a sufficiently sized fan and a correspondingly sized furnace. Moreover, these components must be located relatively close to the athletic field, or in the vicinity of the stadium or the structure where the athletic field is located.

The most efficient way to operate such a system is to place the large fan and the accompanying furnace in a restricted room located adjacent to the athletic field, preferably in the stadium. But if such a location is not available, due to space limitations, then the furnace needs to be located remotely from the piping network that is located under the athletic field, and the routing of the air from the remotely located furnace will cause further heat and energy losses for the system. These issues can be especially problematic if the athletic field is located within a stadium that is landlocked, as is often the case in urban environments, where it has now become popular to build natural turf stadia for soccer.

Further, such systems consume an inordinate amount of energy, due the type of fan and the type of furnace used. For example, one known system is described as using four fans wherein each fan is capable of supplying air at up to 140,000 cubic feet per minute at up to 32 inches WC status pressure. A fan of this type consumes a significant amount of electrical energy during continuous operation. For this same system, the furnace, which typically operates on natural gas fed by a 4 inch supply line, itself is believed to require a floor footprint of about 1000 square feet, and to require a relatively high ceiling, may be even as high as about 16 feet.

It is an object of the present invention to warm the root zone of a natural turf athletic field in a manner that is more practical, more flexible, and also significantly lower in cost and in energy consumption than the current conventional systems.

It is another object of the present invention to incorporate a relatively low cost root zone warming feature into a known and dependable system used with a natural turf athletic field, wherein the system accommodates gravity drainage, irrigation, vacuum-enhanced drainage, and aeration, wherein the added root zone warming feature does not require such a large amount of additional space and does not consume such a disproportionate additional amount of energy.

SUMMARY OF THE INVENTION

The present invention achieves the above-stated objects by incorporating an economical and space saving air supply and warming structure into a system for providing gravity drainage, vacuum-enhanced drainage, irrigation, and optionally sub-irrigation for a natural turf athletic field. This air supply and warming structure includes a constant air supply source, preferably a positive displacement blower, in fluid communication with the natural turf via a subsurface piping network and a conduit operatively connected thereto, with a variably controllable valve residing along the conduit between the constant air supply source and the natural turf. The variably controllable valve includes, or is fitted with, an actuator with modulatory capability, such that it can be variably opened a desired amount, from 0 to 100%, to control flow through the conduit.

By variably controlling actuation of this valve located adjacent the outlet of the constant air supply source, a user is able to selectively impede the air flow, i.e., to apply friction, or flow resistance, to the output end of the constant air supply source. When the output air flow is impeded in this manner, the constant air supply source must then work harder to continue to supply the same volume of air, which results in an increase in the operating temperature within the constant air supply source. This temperature increase transfers to the air that flows from the output end of the constant air supply source, through the valve, and eventually to the natural turf, to achieve warming of the root zone of the natural turf.

By using a constant air supply source that is able to supply a generally constant volume of air, which for one installation is known to be in the range of 1000 to 3000 cubic feet per minute, while consuming minimal electrical energy, in cooperation with a variably controllable valve that is selectively actuatable, the disclosed system is more practical, and is significantly lower in cost and more energy efficient than conventional systems that are currently used to warm athletic fields. Among other reasons, the disclosed system does not require a furnace to warm the air that is supplied to the root zone of the natural turf. The elimination of the need for a furnace represents a substantial savings in terms of energy consumption and corresponding costs, as well as physical space requirements within the venue.

Further, with the disclosed system the constant air supply source and the controllable valve can be readily incorporated into an existing system for supplying gravity drainage, vacuum-enhanced drainage, irrigation, and sub-irrigation to a natural turf athletic field, without requiring any additional disproportionate amount of space. More specifically, as presently disclosed, the constant air supply source occupies a relatively small footprint, in terms of floor space and height.

Comparatively, with existing conventional systems that use a furnace to convectively heat air that is supplied through a duct at a flow rate needed to sufficiently warm a natural turf, the furnace/fan assembly itself will generally require a minimum footprint of 1000 square feet, and a height of 10 feet or more. For an athletic field that is part of a stadium located in an urban environment, and perhaps landlocked, in some situations this space will simply not be available. Even if the space is available, the use of such a furnace in the stadium still requires a disproportionate amount of space that could otherwise be used for other stadium operations. Alternatively, locating a furnace remotely would add to the costs associated with delivering warmed air to the root zone of the natural turf. Further, even without considering the additional losses associated with remotely locating a furnace, the use of a furnace to heat the air supplied to a natural turf already consumes a disproportionately high amount of energy resources. Thus, remotely locating the furnace makes a bad situation even worse.

Still further, with the disclosed system a user is consistently and readily able to control the temperature of the air supplied to the natural turf, because there is a known correlation between the air flow impedance at the output of the constant air supply source, as measured by the amount that the variably controllable valve is open, and the corresponding temperature of the air supplied to the turf. For example, with the preferred positive displacement blower, when the variably controllable valve is closed further, so as to produce an increase of one pound per square inch in fluid pressure at the valve, there is a corresponding temperature increase of 13 degrees Fahrenheit in the air supplied by the blower. This correlation remains relatively constant. And conversely, progressive opening of the variably controllable valve results in reduced friction, and a lower temperature of the air flowing from the constant air supply source.

Therefore, by knowing the pressure at the variably controllable valve, i.e., the percentage that the valve is open, the user knows the temperature of the air that is flowing therethrough. As a result, a user can reliably and repeatably deliver warmed air to the natural turf at known temperatures and flow rates. Also, to assure reliability, the system preferably also includes temperature sensors in the piping network to measure the temperature of the air flowing therethrough. The temperature sensors enable the user to verify and/or recalibrate the blower and/or the variably controllable valve, as needed, to achieve the desired air flow conditions, and to identify the blower and valve settings that correspond to those desired conditions, to achieve the desired root zone temperature.

According to a presently preferred embodiment of the invention, a natural turf athletic field includes a particulate subsurface that supports the roots of the natural turf and in which a piping network resides. A constant air supply source is in fluid communication with the piping network, and residing therebetween is a variably controllable valve, preferably electrically actuatable, fitted with a modulating actuator. A subsurface vault also resides therebetween, located adjacent to or below the constant air supply source, and the vault serves as the connection point for the primary components of the system. More specifically, the vault serves as the discharge point for the piping network, and it also connects to the constant air supply source via a conduit along which the variably controllable valve resides.

The vault serves as the routing point for all water and air that flows to or from the natural turf and the other components of the system. For example, a discharge line with a downturn connects to the vault. The discharge line is the largest pipe of the overall system. Water above the discharge line flows by gravity outwardly from the vault via the discharge line. The largest pipe of the piping network that drains the athletic field, referred to as the "main" pipe, connects to the vault at a level above the discharge line. This main pipe includes an electrically actuated main valve located adjacent the vault, to selectively open or close fluid communication between the piping network and the vault. If the main valve is open, rain falling in the athletic field will naturally flow by gravity through the main pipe, past the main valve and into the vault, and then out of the vault via the discharge line.

A vacuum pump operatively connects to the vault near the top thereof. With the main valve open the vacuum pump is operable to selectively apply vacuum to the vault, and hence to the piping network and to the turf, to achieve vacuum-enhanced drainage. As stated above, the positive displacement blower also operatively connects to the vault, via the conduit, with the variably controllable valve located along the conduit, near an output end of the blower. The constant air supply source is isolated from the vacuum when the vacuum pump is operating, by completely closing the variably controllable valve. Conversely, the vacuum pump outlet is closed off, i.e. isolated, when the constant air supply source is pushing air into the vault. Thus, at any given time only one of these two components operates. They never operate simultaneously.

The vault is preferably of conventional size and located adjacent the athletic field. The vacuum pump may reside on top of the vault, and typically requires only about 10 square feet of floor space. According to the present invention, the overall size and the spacing of the components that supply warmed air to the root zone of the natural turf is relatively small, particularly when compared to conventional systems that require a large fan and a furnace.

A controller operatively connects to the blower, the controllable valve, the vacuum pump, the main valve, and also to a plurality of temperature sensors located within the subsurface particulate of the athletic field, and preferably also to another plurality of temperature sensors located in the piping network. Further, the controller can also be operatively connected to a water source and to at least one of a standard above-ground watering system and a subsurface-irrigation system. This enables the user to selectively control and coordinate one or more of: above-ground watering, watering via sub-irrigation, gravity drainage, vacuum-enhanced drainage, aeration of the natural turf, or aeration of the natural turf with warming of the air supplied to the root zone thereof. If desired, a chilling device could be used to introduce cooling as to the vault, and then to the root zone.

Another advantage of the current root zone warming system is that the warm air conduits are of reasonably small and easily manageable size. For example, the diameter of the conduit is the same as the outlet end of the constant air supply source, and is preferably about only 10 inches. This conduit connects to a vault that has an internal volume of about 400 cubic feet, and the pressurization air flows therefrom into the piping network via a main pipe of about 15-18 inches in diameter. This diameter is less than 2× the diameter of the outlet and the conduit, which is 20 inches. Thereafter, the air flows to pipes that are of successively smaller diameter, and in the preferred embodiment, eventually to the horizontally elongated pipe.

The present invention more consistently and readily varies, and thereby controls, the temperature of warming air that is supplied to the root zone of a natural turf athletic field, with a high degree of reliability. Moreover, it does so in a relatively simple manner, that is flexible in operation, and lower in cost and space requirements.

Further, the present invention supplies warm air pressurization to a natural turf athletic field, with the warm air having a temperature generally in the range of about 0-105 degrees Fahrenheit above ambient air temperature. The present invention supplies this warm air pressurization for an extended duration of time, while consuming minimal energy, and also while occupying only minimal floor space and height. In one application of this invention, with a standard sized soccer field, the invention supplies the warm air at a volume flow rate in the range of 1000-3000 cubic feet per minute. However, for a larger field, higher volumes could be delivered, up to perhaps 6000 cubic feet per minute.

Those skilled in the art will recognize that this technology is suitable for athletic fields that comprise entirely natural turf, and also those athletic fields wherein some or all of the field surface includes a stabilized natural turf, which is sometimes referred to as a "hybrid" natural turf, wherein an artificial turf component are incorporated into the root zone, and sometimes also into the turf canopy.

Up to this point, this specification has described the invention in the context of a natural turf and that is how the invention originally developed. However, all of the same general principles could be used to minimize or even eliminate the adverse effects of subsurface freezing for an infilled artificial turf. As is known, such a turf includes upstanding artificial grass-like fibers that are in part supported by a subsurface infill of particulate material. Such artificial turfs can be susceptible to accelerated wear effects due to sub-freezing, or freezing, or near-freezing ground temperatures. Also, the shock absorption capability of the artificial turf can be considerably less under such conditions.

Given the relatively low cost in terms of equipment, and space requirements, it makes sense to consider using the present invention for treating the subsurface of an artificial turf. The general structure of such a system would be the same, although the subsurface vertical dimensions could be reduced, and the piping network could be reconfigured and/or simplified. So even though the following section specifically refers to a natural turf, those skilled in the art will recognize that this invention is applicable to athletic fields in general, including to a current conventional infilled artificial turf athletic field. Accordingly, the claims of this application are more general than those of earlier related applications.

Also, those skilled in the art will more readily appreciate and understand the features of the present invention when considered in the context of the accompanying drawings, which are briefly described in the next section and then described in more detail in the section thereafter.

DETAILED DESCRIPTION OF THE DRAWINGS

Figure 1:
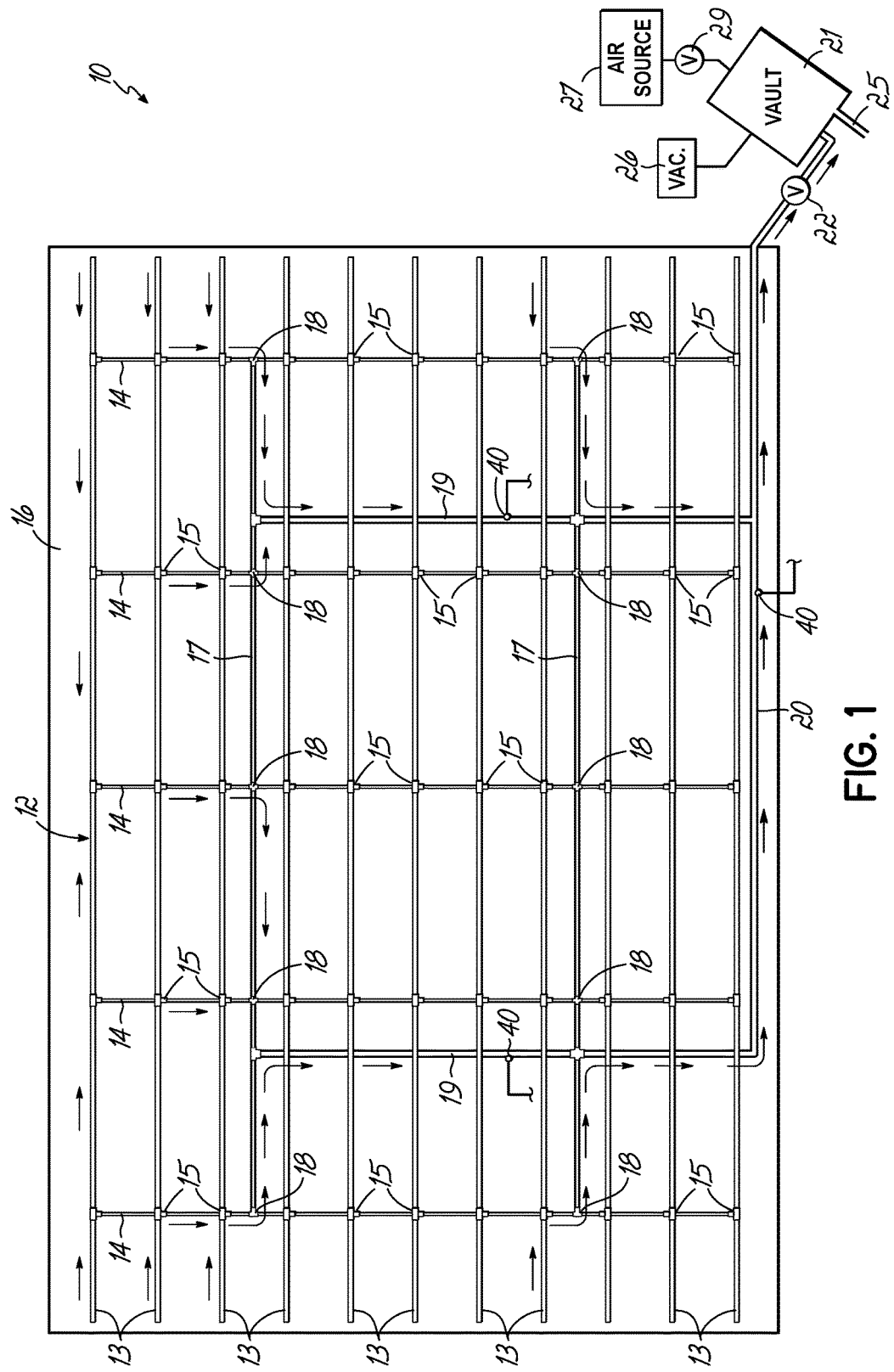
FIG. 1 is a schematic top plan view of a root zone warming system for a natural turf athletic field, according to a currently preferred embodiment of the invention. Directional arrows generally show the direction of water drainage from the athletic field.
Figure 3:
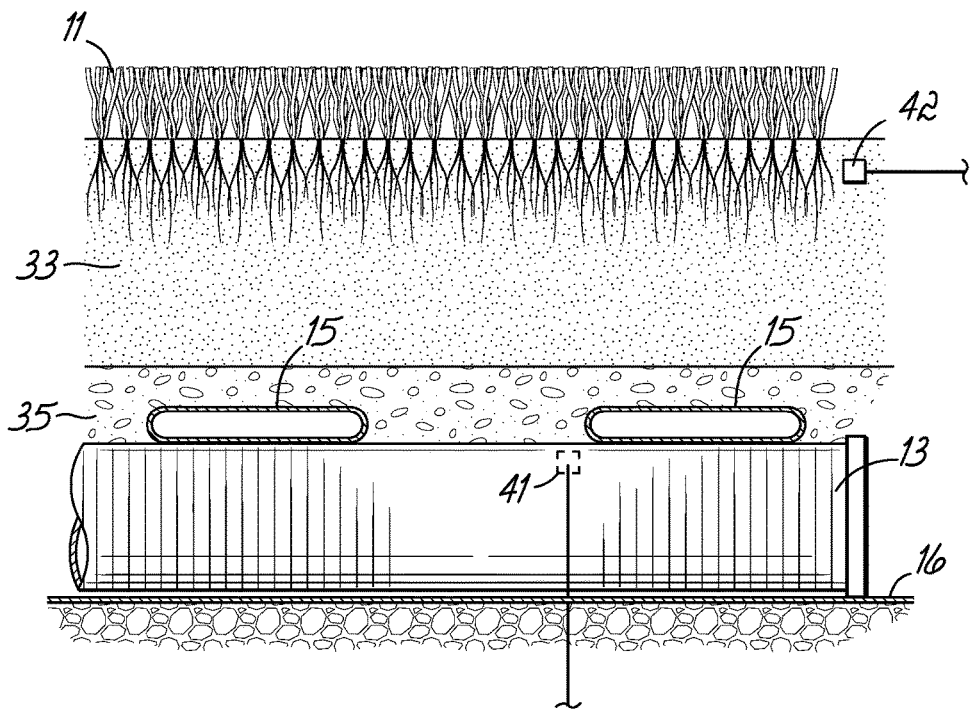
FIG. 3 is a transverse cross-sectional view along lines 3-3 of FIG. 2.
Figure 4:
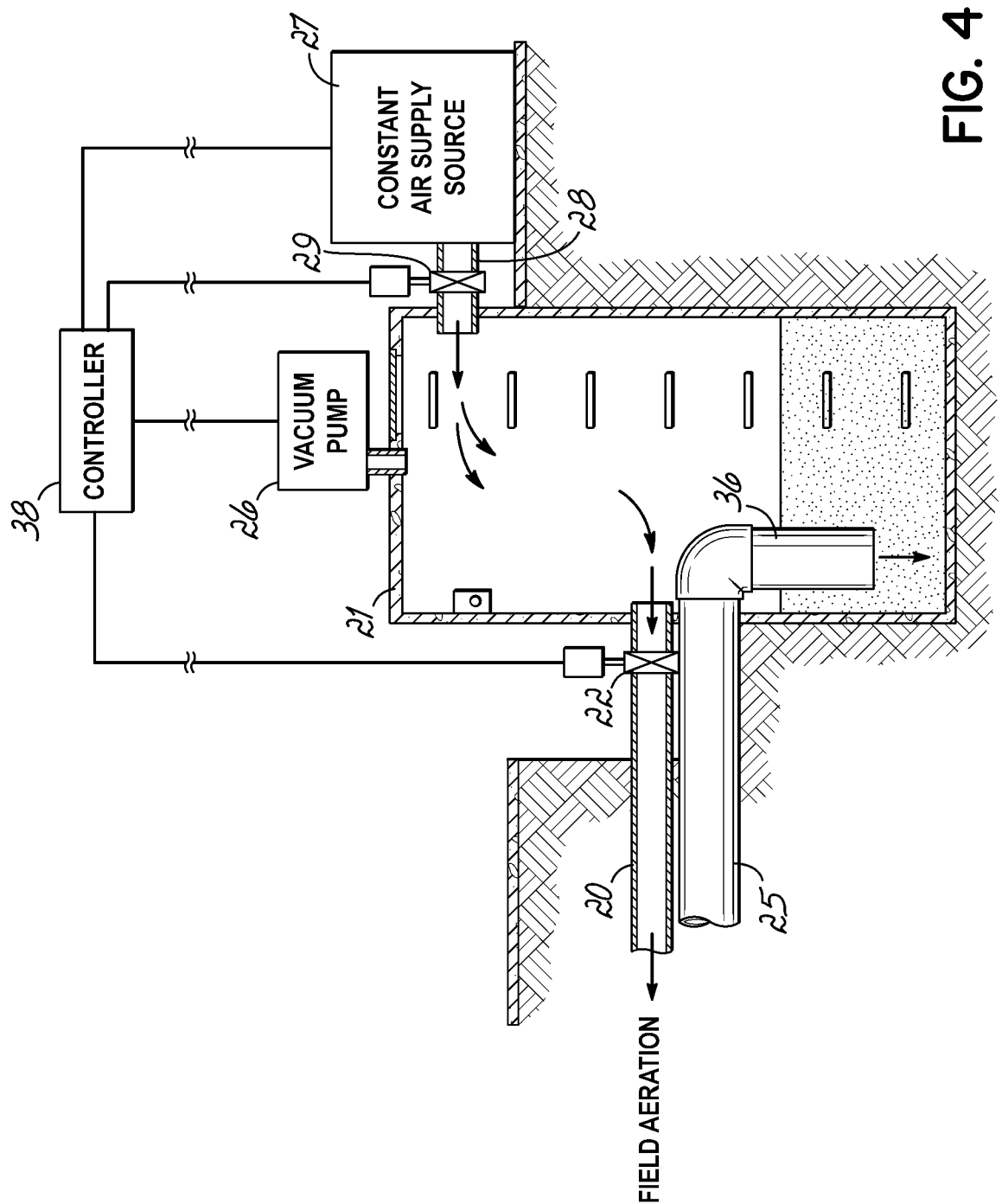
FIG. 4 is a schematic horizontal cross-sectional side view of a vault that is included in a root zone warming system of the present invention, according to a preferred embodiment, with the vault shown operatively connected to a number of additional components of the system.
Figure 5:
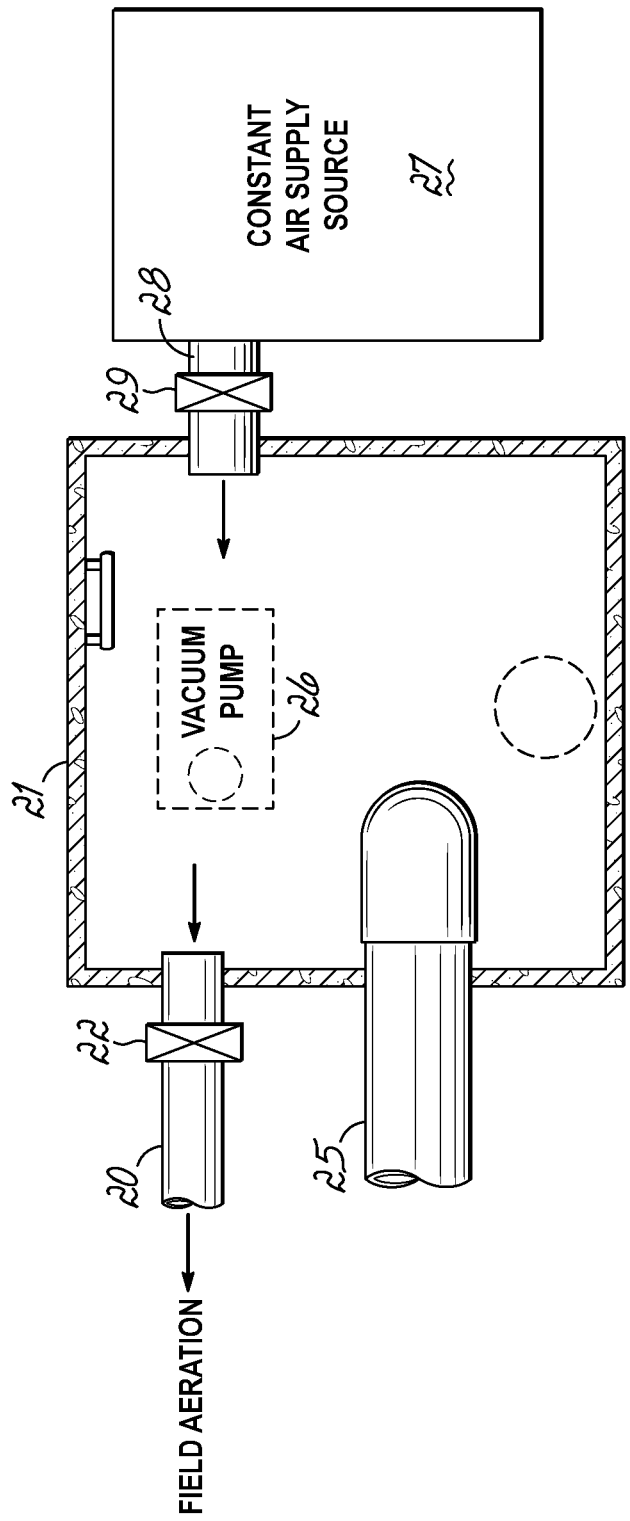
FIG. 5 is a schematic top view of the vault shown in FIG. 4.

FIG. 1 shows a system 10 for warming the root zone of a natural turf 11 according to a currently preferred embodiment of the invention. In this specification the phrases natural turf and athletic field are used interchangeably for convenience and because they occupy the uppermost portion, i.e., the surface, of the structure served by the system 10. The system 10 includes a subsurface piping network 12, which is shown schematically in plan view in FIG. 1. Those skilled in the art will appreciate that the particular numbers of rows of the pipes shown herein, and the dimensions stated for the pipes in those rows, can be varied to accommodate different considerations. This particular piping network 12, as shown and described, represents a currently preferred embodiment for one particular known venue. However, depending on other considerations, such as environment, costs, and availability, the piping network and its components are amenable to alternative variations. FIGS. 1, 1A, 2, and 3 show the details of the piping network 12, while FIGS. 4 and 5 show the details of the system. Although applicant has used polyethylene, the piping network 12 may comprise components made of any suitably strong and durable material.

More specifically, the piping network 12 includes eleven rows 13 of longitudinally extending pipes. Each of these longitudinally extending pipe rows comprises a low profile pipe having a horizontally elongated shape, in transverse cross section, so as to occupy a relatively minimal volume of the subsurface, as disclosed in the 784 patent. Nonetheless, compared to the 784 patent, these longitudinally extending pipes 13 include transversely oriented openings in the downwardly directed surfaces thereof, preferably on the ridges, or outermost surfaces of the corrugations thereof. These openings enable fluid communication between the system 10 and the natural turf, i.e., water drainage and air flow, as described in more detail with respect to the other Figures.

As shown in FIG. 1, the eleven rows of longitudinally extending pipe 13 intersect with five rows of transversely extending pipes 14, each of which preferably has a six inch diameter. At each of the intersections of the longitudinal rows 13 and the transverse rows 14, a low profile coupling 15 is used, also as disclosed in the above-identified 784 patent. A barrier 16 resides below the longitudinal rows 13 and the transverse rows 14. Preferably, the barrier 16 is water impermeable, so as to enable water conservation practices. Depending on the customer's preference, and other considerations such as cost and available materials, the barrier does not necessarily need to be water impermeable. In the embodiment shown, the barrier 16 is water impermeable and isolates the natural turf 11 from the substructure located therebelow. Generally, the barrier 16 resides about 14-16 inches underground. Part of the piping network 12 is located above the barrier 16, as explained above, and part of the piping network 12 is located below the barrier 16.

Below the barrier 16, the piping network 12 includes two more longitudinal rows 17, preferably each of ten inch diameter. These two longitudinal sub-barrier rows 17 connect to the five transverse rows 14 via, preferably, inverted T-connectors 18, with one inverted T-connector located at each of the ten intersecting locations shown in FIG. 1. Each T-connector 18 interconnects one above-barrier transverse row 14 with a sub-barrier longitudinal row 17, and in a manner that assures a circumferential seal between the outer surface of the inverted T-connector 18 and the barrier 16, so as to maintain the seal and to prevent any water or air leakage from the subsurface of the natural turf 11 to locations below the barrier 16.

The two sub-barrier longitudinal rows 17 in turn connect to two sub-barrier transverse rows 19, at four intersecting points as shown in FIG. 1. The sub-barrier transverse rows 19 preferably have a 12 inch diameter. These two sub-barrier transverse rows 19 in turn connect to the main sub-barrier pipe 20 that extends longitudinally along one side of the athletic field 11, and is preferably 16 inches in diameter. The main 20 extends to a vault 21 that is preferably located adjacent to the athletic field 11. The main 20 has a main valve 22 located adjacent the vault 21, to close off the fluid connection between the piping network 12 and the vault 21, if desired, for example, during time periods when conserving root zone water is beneficial. Watering may occur either by an above-ground sprinkler system (not shown), or by sub-irrigation (also not shown), or by natural rainfall. By closing the main valve 22 water can be held in the piping system 12, which eventually saturates the natural turf 11.

FIG. 1 also shows that the vault 21 operatively connects to a discharge line 25, a vacuum source, i.e., a vacuum pump, 26, and a constant air supply source 27, which is a device that supplies constant air flow independent of the downstream air flow resistance, at least within certain operating parameters, as explained in more detail below. The constant air supply source 27 connects to the vault 21 via a conduit 28, with a variably controllable valve 29 residing along the conduit 28. The conduit 28 is preferably PVC, but could also be made of any other suitably strong and durable material. A controller 38, not shown in FIG. 1, controls operation of these components of the system 10.

Figure 2:
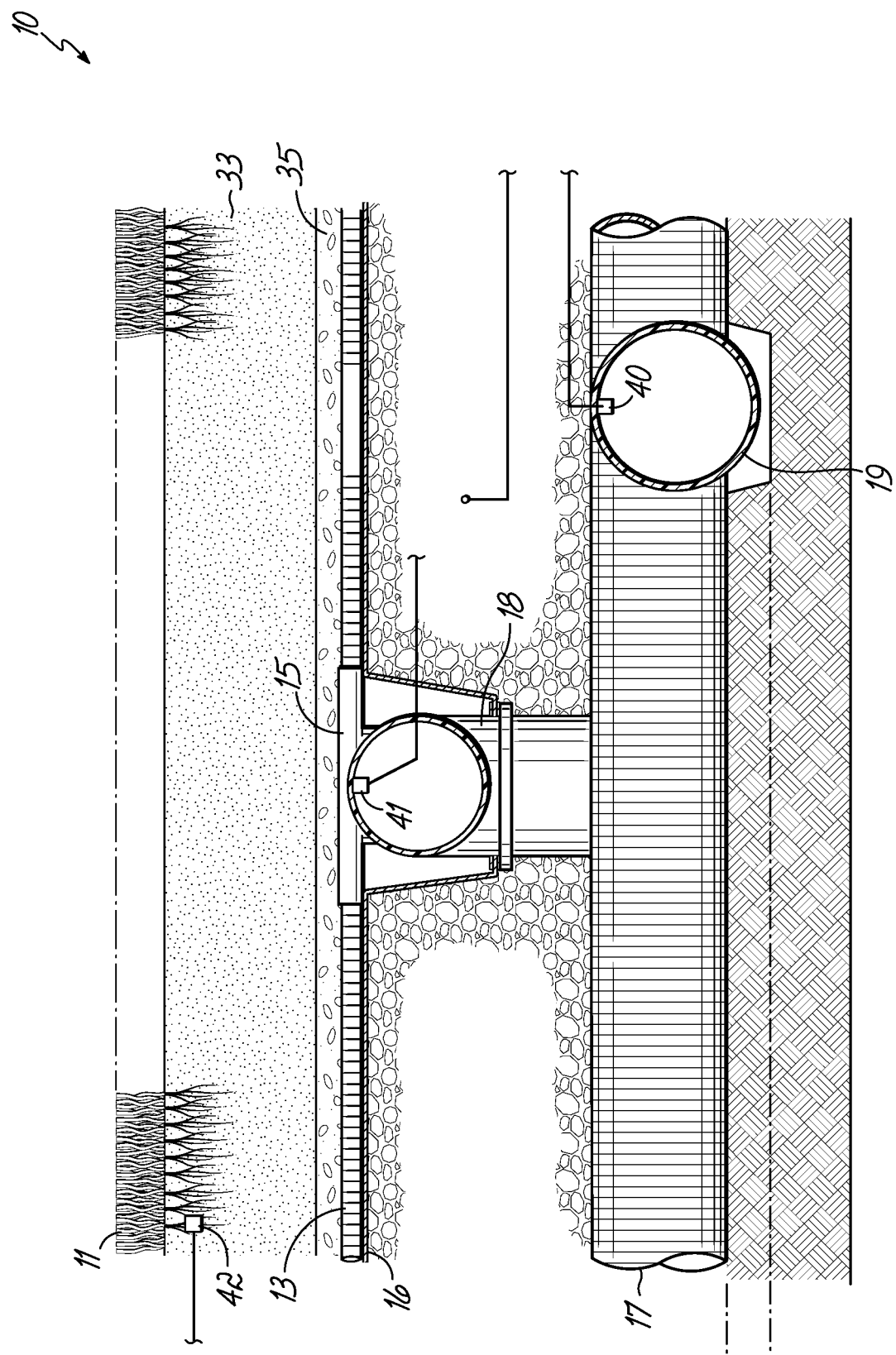
FIG. 2 is a vertical cross-sectional view along lines 2-2 of FIG. 1.

FIG. 2 shows a longitudinal cross-sectional view of the same system 10 and the same natural turf 11 that are shown in FIG. 1, but as viewed from the sideline of the athletic field. With this view, FIG. 2 better shows the vertical relationships of the components of the system 10 relative to the natural turf 11, the piping network 12, and the barrier 16. Although only the transverse rows 19 are shown in this view, and not the main 20, the main 20 resides lower beneath the ground surface than the two sub-barrier transverse rows 19 to which the main 20 is connected, and the two transverse rows 19 are of reduced cross-sectional dimensional, compared to the main 20. However, both the main 20 and the transverse rows 19 have uppermost portions that reside in about the same horizontal plane. Moreover, these two sub-barrier transverse pipe rows 19 extend lower below the surface than the two transverse sub-barrier longitudinal rows 17 to which they connect, which are also of smaller cross-sectional dimension than the pipes residing below. And again, as shown at least partially in FIG. 2, uppermost portions of the rows 17 reside in the same horizontal plane as the uppermost portions of the rows 19, and therefore also partially in the same horizontal plane as the main 20.

In addition to showing the barrier 16 and the above-barrier transverse rows 14 which intersect with the longitudinally extending above-barrier rows 13 of low profile pipe, FIG. 2 also shows more details of the natural turf 11. More specifically, the natural turf 11 includes natural grass plants that extend above the surface of the ground, and roots that extend downwardly into a particulate subsurface material, also called a fill layer. In the embodiment shown, the fill layer includes an upper layer of sand 33. Nonetheless, the particulate subsurface material may comprise other particulate material that is conducive to the growing of natural grass plants. The fill layer 33 is preferably homogenous, at least with respect to each horizontal level, so that the flow of any air or water flowing therethrough is consistent and uniform across the entire surface area of the natural turf 11. The downwardly extending roots of the natural turf 11 extend into the upper layer and define a vertical band of the subsurface referred to in this specification as the root zone. The particulate subsurface is porous enough to enable pressurized air to flow upwardly therethrough when air is pushed into the piping network 12 from the constant air supply source 27. Again, the fill layer is of consistent particulate, thereby to promote consistency in drainage, whether gravity drainage or vacuum enhanced drainage, and also consistency in aeration.

In the preferred embodiment shown, the subsurface fill layer includes a lower layer of uniformly sized gravel 35, with this lower layer 35 having a depth of about 6 inches above the barrier 16. The upper layer 33 of sand is about 10 more inches, and so there is about 16 total inches of subsurface located above the barrier 16. As noted previously, the low profile pipe 13 includes corrugations, and the openings of the piping network 12 reside along the corrugations in the bottom surfaces thereof, and are directed downwardly. This places the water/air flow openings directly opposite an upper surface of the barrier 16. The lower layer 35 of gravel surrounds these longitudinal pipes 13 in between the rows and also for a few inches thereabove.

Figure 1A:
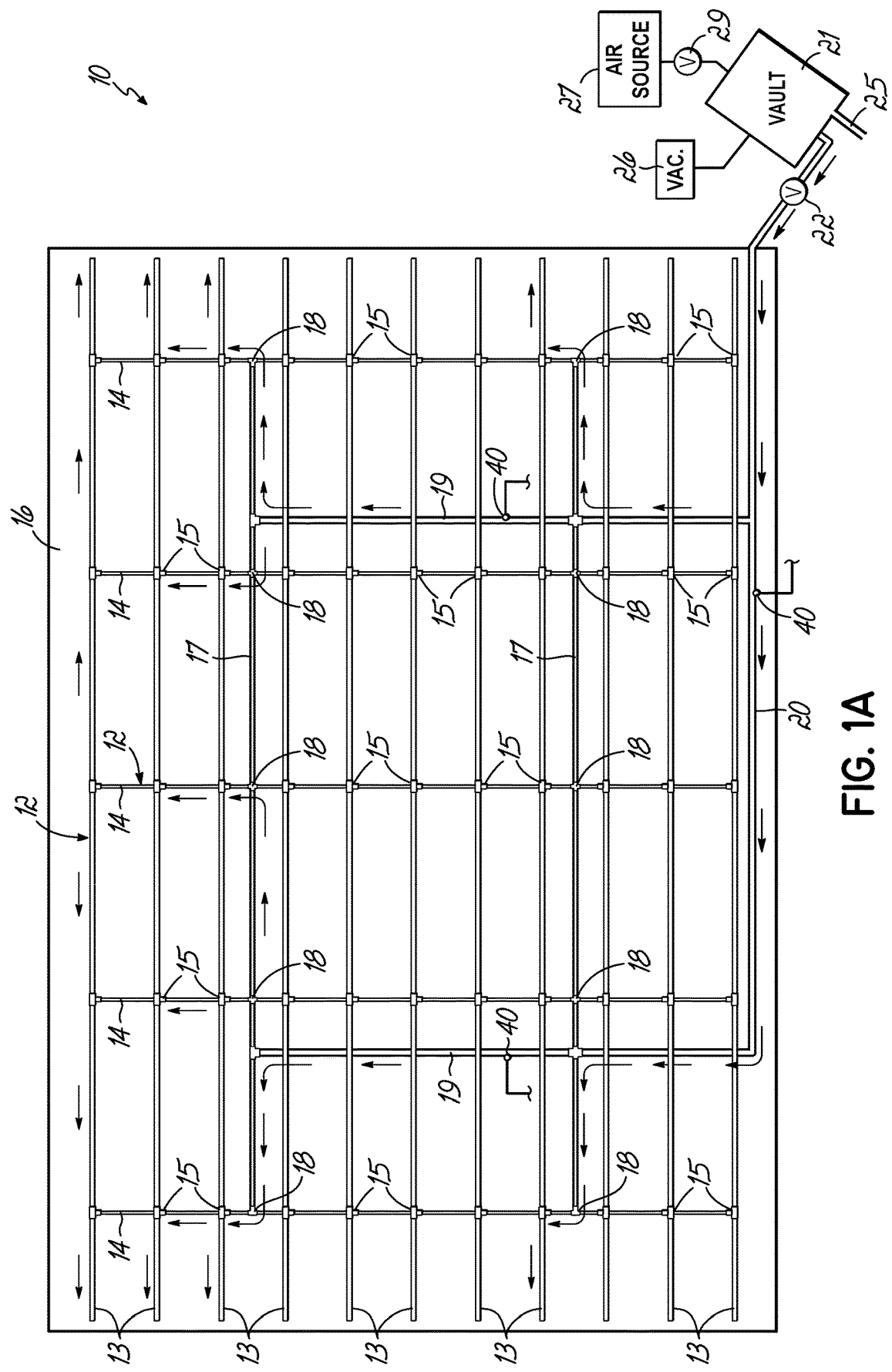
FIG. 1A shows the same schematic top plan view of the same athletic field, but in FIG. 1A the directional arrows generally show air flow into the athletic field, to pressurize the subsurface.

With this type of particulate subsurface, the athletic field 11 is water and air permeable. More specifically, water drains relatively quickly in a downward direction due to gravity, and the downward flow can be enhanced via the application of vacuum. FIG. 1 includes directional arrows to show this flow into and through the piping network 12, to the vault 21 either by gravity alone or vacuum-enhanced. Additionally, by supplying positive pressurization into the piping network 12 via the openings in the pipes 13, the system 10 pushes air upwardly through the athletic surface 11 and into the atmosphere. FIG. 1A includes directional arrows that generally show the pressurization flow, from the vault 21 into the piping system 12 out of the pipes 13 and into the subsurface, then upwardly from the athletic field. The general principle of aerating an athletic field via pressurized air flow is already known in the industry. However, applicant has provided this explanation of these structural features because the system 10 is not known. And this explanation of this particular piping network 12 of this system 10 will enable a reader to better understand its operation. Additionally, although not specifically shown, applicant further contemplates an alternative embodiment of the invention whereby each of the eleven rows of longitudinally extending pipe is truncated into row segments that are disconnected between each of the corresponding rows of transversely extending pipes. This alternative structure would thereby have two opposing "dead ends" connected to each transition joint 15. This alternative embodiment would create heat dissipation at each of these terminating segments, or dead ends.

Figure 2A:
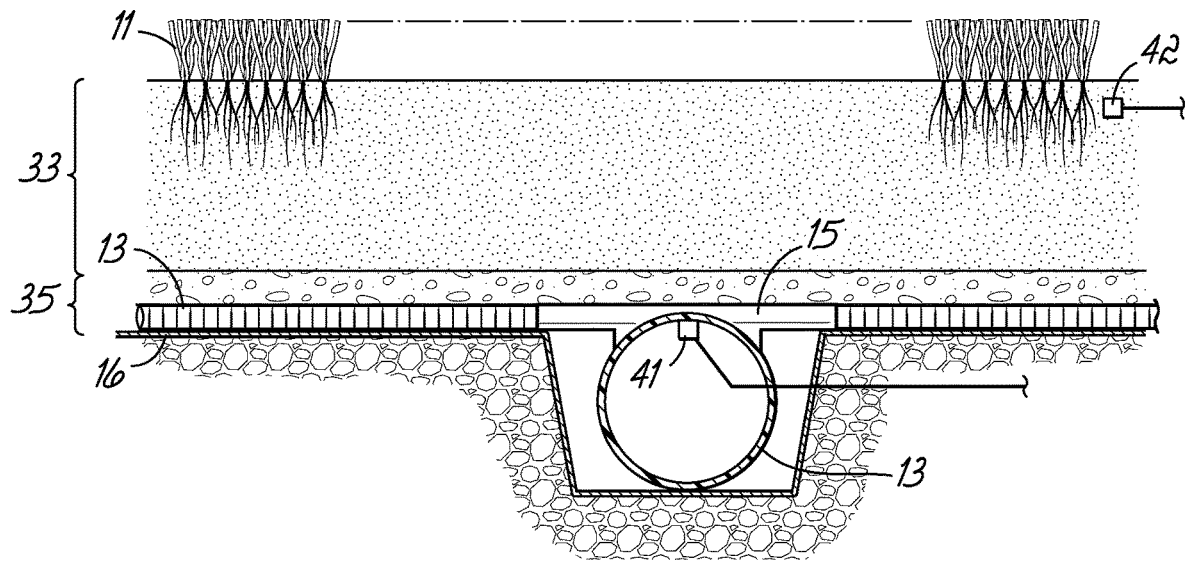
FIG. 2A shows the same view as FIG. 2, but in a different location so the view does not include the structure of the piping network that resides below the barrier, compared to FIG. 2.

FIGS. 2 and 2A show that the barrier 16, which in this case is preferably water impermeable, serves as a boundary between upper and lower parts of the piping network 12. The inverted T-connectors 18 extend therethrough and then downwardly therefrom, preferably a vertical distance of about 8 inches. In one embodiment, the inverted T-connectors 18 include a surrounding flange that is welded circumferentially to the barrier 18.

Within the piping network 12 there is a first plurality, or set, of temperature sensors 40 located within the main 20 or the rows 19 connected thereto, and preferably also a second set of temperature sensors 41 located at a second, higher vertical level, preferably within the transverse rows 14. Further, the system 10 includes a third plurality of temperature sensors 42 in the upper layer 33, to measure the temperature in the subsurface where the roots reside. Each of the third plurality of sensors 42 is preferably located about 3 inches below the surface, and the sensors 42 are spaced generally equidistantly around the field 11. All of the sensors 40, 41, and 42 operatively connect to the controller 38, by hardwire or by wireless connection, as desired. By locating these three sets of sensors 40, 41, and 42 at different vertical levels, a user is able to measure the warming effect on the subsurface root zone as the warm air progresses from the vault 21, in terms of how long it takes to get the upper layer 33 to a desired temperature, and the extent of any heat loss as the warm air flows from the vault 21 to the natural turf 11. FIGS. 2A and 3 show the relative vertical positions of the second and the third pluralities of sensors 41 and 42, respectively.

FIG. 4 shows a schematic view of the vault 21 located adjacent the athletic field 11, including the discharge line 25 that extends into the vault 21 and has a turndown 36 to help isolate the discharge line 25 from the above-water atmosphere in the vault 21. This turndown 36 assures that some water will always remain in the bottom of the vault 21, up to the horizontal level of the bottom of the discharge line 25. Above the discharge line 25, the main line 20 terminates at the vault 21, and the main line 20 can be isolated from the vault 21 by a main valve 22, which is actuatable between on and off positions. The controller 38 operatively connects to the main valve 22, and also to the variably controllable valve 29 located along conduit 28. Again, the operative connections to the controller 38 may be a hard wire or wireless, i.e., remote, depending on the particular conditions of the athletic field 11 and the owner preference.

FIG. 4 also shows the vacuum pump 26 operatively connected to a top end of the vault 21 and operable to supply vacuum to the inside thereof. When the main valve 22 is open and the vacuum pump 26 is operating, the vacuum pump 26 applies vacuum to the vault 21 which causes vacuum to be applied to the piping network 12 via the main 20, and eventually to the rest of the piping network 12 and then to the natural turf 11 located thereabove. As described above, the application of vacuum to the piping network 12 provides vacuum-enhanced drainage capability for the natural turf 11. When there is no need for vacuum-enhanced drainage, the vacuum source 26 is isolated from the inside of the vault 21. As shown in FIG. 4, the vacuum source 26 also operatively connects to the controller 38.

Further, as shown in FIG. 4, the constant air supply source 27 operatively connects to the vault 21 via the conduit 28, and the variably controllable valve 29 is located on the conduit 28 near an outlet end of the source 27. Each of the source 27 and the variably controllable valve 29 also operatively connects to the controller 38. In FIG. 4 the directional arrows show air flow that occurs during aeration of the athletic field 11, with the air flowing from the source 27 through the conduit 28, including past the variably controllable valve 29 and into the vault 21, into the main 20 (with main valve 22 open), into the rest of the piping network 12, and then outwardly from the bottoms of the uppermost pipes 13 and into the lower layer 35 of gravel 35, then the upper layer 33 of sand, and thereafter upwardly from the athletic field 11 and into the atmosphere. In this pressurization mode, air supplied from the air source 27 flows into the vault 21 and eventually upwardly from the athletic field 11, via the openings in the bottom surface of the longitudinal extending pipes 13.

FIG. 5 shows a top view of the vault 21, and the relative positions of the various components from that view.

Although any one of several different structural components could potentially be suitable for use as the variably controllable valve 29 disclosed herein and shown in the Figures, applicant has used a Center Line Series 200 resilient seated butterfly valve, sold by Crane Chem Pharma & Energy, in combination with a Series 44000 on/off rotary electric modulating actuator also sold by Crane, as shown at www.craneenergy.com. The material linked at this website is expressly incorporated by reference herein, in its entirety. This type of variably controllable valve 29, i.e., a valve fitted with a modulating actuator, is controllable so as to specifically vary between 0 and 100% the amount that the conduit 28 is open for air flow therethrough. Stated alternatively, the valve 29 can be set at a particular percentage of the transverse cross sectional area of the conduit 28. The amount of openness of the valve 29 determines the flow resistance, or flow impedance, in the conduit 28 near an output end of the constant air supply source 27. For example, opening of the valve 29 to 100% open optimally reduces the air flow resistance, while closing the valve 29 to 0% open closes off all air flow entirely. And between those two extreme boundaries, the percentage of openness corresponds to a particular air flow resistance.

When the constant air supply source 27 is operating, the degree of openness of the valve 29 correlates to a flow resistance as measured by pressure, specifically in pounds per square inch. Further, although any one of a number of different components could potentially serve as the constant air supply source 27 that is disclosed herein and shown in the Figures, applicant has used a positive displacement blower sold by United Blower Inc., particularly Model/Style UBI. 250 (LHS). The specifications for the above-identified valve 29 and this blower 27 are expressly incorporated by reference herein, in their entireties. This blower 27 preferably includes an output end with a size that matches the dimensions of the conduit 28, preferably a circular transvers cross sectional shape, with a diameter of 10 inches. The blower 27 has temperature sensor and pressure sensors/transmitters (not shown) at the output end thereof, which are used to supply temperature and pressure measurements to the controller 38. The blower 27 is preferably located adjacent the vault 21, and at a location where there is a continuous and uninterrupted supply of ambient air to feed the blower 27.

This blower 27 is a type of rotary blower. Within the relevant operating ranges related to inlet air flow, blower speed (in r.p.m.), horsepower, and outlet air flow (in cubic feet per minute), for every increase of one pound per square inch in the flow resistance in the conduit 28, the blower 27 experiences an increase in temperature of about 13 degrees Fahrenheit above the ambient air temperature in the environment of the room that houses the system 10. This temperature increase occurs because the nature of the blower 27 is to, within certain parameters, work harder to continue to supply a constant air flow at the desired volume. This need to work harder to continue to supply a constant air flow generates heat within the blower 27, and this heat transfers to the air that is being supplied to the conduit 28 at the constant flow rate. This heated, or warmed, air then successively flows to the vault 21, the piping network 12, out from the bottom openings in the uppermost rows 13 and into the lower layer of gravel 35, and then upwardly through the fill layer 33 and through the natural turf 11 and into the atmosphere.

The blower 27 operates so as to supply a constant air flow into the conduit 28, to warm the air supplied to the root zone. The operating settings of the blower 27 do not need to be continuously maintained or varied by the user during the time that the warm air is being supplied to the root zone of the natural turf 11. Rather, the controller 38 monitors the operating parameters to assure continuous operation, and the desired settings or parameters can be programmed into the system 10. Thus, independent of the blower 27, by operating the controller 38 the system 10 controls the valve 29, as needed, to change the flow resistance and the corresponding air temperature in the conduit 28. The changes in flow resistance in the conduit 28 can occur independently of the normal operation of the blower 27. Nonetheless, over time, by sensing the temperature and pressure of the air as it flows from the output end of the blower 27, and correlating the sensed air temperature and the sensed air pressure with the known positions of the valve 29 and the operating frequency of the blower (in Hz), the system 10 can reliably and repeatably control the temperature and the volume of the air that flows into the vault 21 and thereafter into the piping network 12. Further, by sensing the temperature of the air at one or more specific locations within the piping network 12 or the subsurface, via the sensors 40, 41, and 42, the system 10 can determine the amount of heat loss, if any, in the air as it moves from the vault 21 to the fill layer 33. And still further, by sensing the temperature of the fill layer 33 during the time when the warmed air is supplied by the blower 27, via sensors 42, the system 10 can determine the amount of warmth that is ultimately delivered to the natural turf 11. Thus, this system 10 provides a high degree of capability for measuring the volume and the temperature of warmed air that is supplied to the root zone, and these measurements can then be used to identify and correlate optimum control conditions for the system 10, for a particular environment.

For example, once the upper layer 33 has reached a desired temperature, the fill layer, and particularly the lower layer 35, may hold the warmth and therefore require less continuous warm air and/or a lower air temperature in order to continue to maintain the same desired temperature in the root zone. This means that the user may be able to reduce the operating frequency and therefore the power (in horsepower) supplied to the blower 27 in order to maintain the same temperature for the root zone. In one initial test of a system 10 in place, applicant tested and learned the following helpful parameters.

PARAMETER CHART

| Outlet Air Temp | Valve % closed | Freq. (Hz) | Flow Rate | Motor Amps/hp | Outlet Pres |
|---|---|---|---|---|---|
| 163 F. | 68 | 60 | 3000(cfm) | 130/114 | 7.0 p.s.i. |
| 148 | 66 | 50 | 2600 | 125/110 | 6.6 |
| 145 | 76 | 40 | 1700 | 124/110 | 6.8 |
| 163 | 81 | 30 | 1500 | 132/116 | 7.8 |

In this chart, the second column represents the limit on the amount of closing of the valve 29, at that particular operating frequency, such that any further closing would likely cause a risk of overloading the motor of the blower 27. If the operating parameters shown in the first row succeed in achieving the desired temperature at the root zone temperature sensors 42, then the user may choose to reduce the flow rate by reducing the operating frequency of the blower 27, and correspondingly opening the valve 29 to a higher percentage of openness. Conversely, if thereafter the user determines that the temperature needs to increase, the user could increase the operating frequency, and the corresponding flow rate, while also opening the valve 29 an appropriate amount. Stated alternatively, and as shown in the chart, the degree to which the valve is closed may be the reference used, so long as there is consistency.

With this system 10, a user is able to reliably and repeatably supply warmed air to the root zone of a natural turf 11. One primary advantage of this system 10 is that it reduces the time period during which the roots of the natural turf remain dormant during the winter months. More particularly, at the end of the fall this system 10 enables the roots to remain viable for additional time, while at the beginning of spring this system 10 enables the roots to begin reviving sooner. It is not the purpose of this system 10 to melt snow, or to maintain a natural turf field in an unfrozen condition over the entire winter. In that respect the system 10 should be understood as supplying conditioning or buffering for the roots. Nonetheless, if desired, the system 10 could be combined with a heating system, for instance via, hydronics or electric cable if the field owner chooses to be more aggressive in maintaining a viable natural turf surface over the entire winter.

From a dimensional perspective, this system 10 saves a tremendous amount of space, compared to conventional systems. For example, according to the specifications with which application is familiar the preferred blower 27 has a floorprint, or footprint, of 64 inches (5' 4") by 79 inches (6'7"), which is less than 36 square feet. It also has a height of just under 84 inches (7'), which means the cubic volume of the blower is less than about 252 cubic feet. In some situations, some additional dimensional flexibility may be needed to accommodate service access. Regardless, in comparison, the volume occupied by the furnace or furnaces of other systems is known to be at least about 10,000 cubic feet, or possibly even more. As noted above, in some environments, especially where the field site is landlocked, there is not that much available space.

Further, the blower 27 is preferably located directly over or spaced only several feet from the vault 21, to provide a sufficient amount of space, or volume, for the valve 29. The vault 21 preferably has a height of 13', and internal horizontal dimensions of 6' by 6'. Often, the vault 21 is designed to be below ground. These components are preferably housed in a space where a ready and constant unimpeded supply of intake air will be available for the blower 27.

From a consumption of energy perspective, this system 10 presents a significant savings because it eliminates the need for a furnace to supply warmed air to the root zone of a natural turf 11. For the system 10 currently in place, the blower 27 and the valve 29 occupy minimal space, yet supply warmed air in a temperature range of 0-105 degrees Fahrenheit above ambient temperature, at a volume of up to about 3000 cubic feet per minute, and require only minimal electrical energy. In this context, ambient temperature could be in the range of about 25-90 degrees Fahrenheit. This flow rate will increase with a larger athletic field, possibly going as high as 6000 cubic feet per minute. Regardless, even with a larger field, conventional systems require significantly more space and consume significantly more electrical energy, and also more natural gas.

This specification discloses one presently preferred embodiment of the invention. Nevertheless, those skilled in the art will recognize that this specification is exemplary, and that the invention is not limited by the specific structural details of the presently disclosed preferred embodiment, as shown and described. Various permutations may be possible. Accordingly, applicant intends for each of the following appended claims to define the scope of the invention.

I claim:

1. A method of warming the subsurface of an athletic field which includes a subsurface particulate material that is air permeable and in which resides a piping network, the piping network including a plurality of pipes with openings formed therein, and wherein the openings permit water to flow by gravity from the subsurface particulate material into the piping network and away from the athletic field, thereby to drain the athletic field, comprising:

causing air to flow into the piping network, and then outwardly from the openings thereof, and thereafter into the subsurface particulate material, and then upwardly from the athletic field, whereby the causing is achieved by a constant air supply source that resides in operative fluid communication with the piping network via a conduit located therebetween; and controlling, during the causing, the flow resistance of the conduit near an output end of the constant air supply source, the flow resistance being variable and whereby a higher flow resistance generates a corresponding higher temperature at the constant air supply source, and thereby warms the air that is supplied therefrom to the conduit and which thereafter flows to the piping network then the subsurface particulate material and then upwardly from the athletic field, to achieve warming of the subsurface.

2. The method of claim 1 wherein the controlling further comprises:

varying the transverse cross-sectional dimension of the conduit during the causing, thereby to achieve a corresponding varying in the warming of the air flowing therethrough and thereafter into the piping network, the subsurface particulate material, and upwardly from the athletic field.

3. The method of claim 1 and further comprising:

sensing the temperature in the piping network and using the sensed piping network temperature to determine the controlling of the flow resistance.

4. The method of claim 1 wherein the constant air supply source supplies air at a flow rate of up to about 3000 cubic feet per minute, and at an output pressure of up to about 10 p.s.i.

5. The method of claim 1 wherein the controlling occurs via the operating of a variably controllable valve located along the conduit.

6. The method of claim 5 and further comprising:

using a controller to control the causing and the controlling, the controller operatively connected to the constant air supply source and to the variably controllable valve.

7. The method of claim 1 and further comprising:

sensing the temperature in the subsurface, and using the sensed subsurface temperature to control at least one of the constant air supply source and the flow resistance of the conduit.

8. The method of claim 7 and further comprising a plurality of sensors adapted to sense the temperature in the subsurface, wherein each of the plurality of sensors is located in the subsurface at about the same depth.

9. The method of claim 3 wherein the sensing the temperature in the piping network uses at least one of a first set of temperature sensors located at a first level in the piping network and also at least one of a second set of temperature sensors located at a second level in the piping network.

10. The method of claim 1 wherein the air flowing into the piping network is warmed to a temperature in the range of 0-105 degrees Fahrenheit above ambient air temperature.

11. The method of claim 1 wherein a vault resides between the piping network and the constant air supply source, the vault operatively connected to a discharge line for providing drainage therefrom and also to a vacuum source for providing vacuum-enhanced drainage.

12. The method of claim 1 and further comprising, for the athletic field, for an extended period of time:

maintaining a subsurface temperature that is sufficient to reduce the onset, degree, or duration of freezing thereof during the winter season.

13. The method of claim 1 wherein the athletic filed comprises an artificial turf with a plurality of upstanding artificial fibers supported in part by the subsurface particulate material.

14. A system for warming the subsurface of an athletic field, wherein the athletic field includes an air permeable particulate subsurface, with a piping network residing in the particulate subsurface, the piping network including pipes with openings therein that permit water to flow into the piping network by gravity to drain the athletic field, the piping network also including an outlet for draining the athletic field, comprising:

a vault located adjacent the athletic field, the outlet of the piping network terminating at the vault, so as to operatively connect the piping network and the vault in fluid communication;

a positive displacement blower operatively connected to the vault via a conduit extending therebetween, the positive displacement blower adapted to push air from an output end thereof into the vault via the conduit, for flow thereafter into the piping network;

a variably controllable valve residing along the conduit between the position displacement blower and the vault and operable to vary the resistance to air flow therethrough, whereby an increase in the flow resistance causes a corresponding increase in the temperature of the positive displacement blower and hence an increase in the temperature of the air pushed therefrom; and a controller operatively connected to the positive displacement blower and the variably controllable valve, the controller adapted to operate the positive displacement blower to cause air to be pushed from the output end thereof through the conduit, including the variably controllable valve, and thereafter into the vault, the piping network, the subsurface particulate material, and upwardly from the athletic field, the controller also adapted to operate the variably controllable valve so as to selectively set the flow resistance in the conduit adjacent the output end of the positive displacement blower, thereby to correspondingly change the temperature of the air pushed by the positive displacement blower, whereby temperature-changed air moves into the vault, the piping network, the subsurface particulate material and eventually upwardly from the athletic field.

15. The system of claim 14 wherein the variably controllable valve comprises a butterfly valve equipped with a modulating actuator capable of being opened from 0 to 100%.

16. The system of claim 14 and further comprising:

at least one temperature sensor located in and adapted to sense the temperature of the subsurface and operatively connected to the controller, to thereby enable the controller to operate the variably controllable valve and the positive displacement blower so as to vary the temperature of the air pushed to the athletic field, based on the sensed temperature of the subsurface.

17. The system of claim 14 and further comprising:

a plurality of like sensors located around the athletic field, each sensor located a predetermined depth from the surface and adapted to sense a subsurface temperature thereat, thereby to obtain a plurality of sensed temperatures from around the athletic field.

18. The system of claim 1 and further comprising:

at least one sensor located in the piping network and operatively connected to the controller and adapted to sense the temperature of air flowing therethrough, thereby to enable a user to operate the controller so as to control at least one of the variably controllable valve and the positive displacement blower in order to maintain, increase, or decrease the temperature of the pushed air based on the temperature sensed in the piping network.

19. The system of claim 14 and further comprising:
a discharge line operatively connected to the vault at a desired vertical level and adapted to enable water to flow from the vault by gravity when a water level in the vault is above the desired vertical level;
a vacuum operatively connected to the vault and adapted to selectively supply vacuum to the vault to thereby cause vacuum to also be applied to the piping network and to the particulate subsurface, thereby to pull air downwardly through the subsurface and into the vault to enhance the drainage of water; and
a main valve located in the piping network adjacent the drain, operatively connected to the controller and selectively closable to allow water to collect in the piping network and in the subsurface, to thereby retain water in the subsurface.

20. The system of claim 14 wherein the output end of the positive displacement blower includes a temperature sensor and a pressure sensor that are operatively connected to the controller.

21. The system of claim 14 and further comprising:
a barrier residing below the subsurface particulate material, and defining an upper portion of the piping network located above the barrier and a lower portion of the piping network residing below the piping network, wherein the pipes of the piping network with openings are part of the upper portion, and the openings are located in downwardly directed surfaces of pipes in the upper portion and also located adjacent the barrier, and wherein the barrier is water impermeable.

22. The system of claim 21 wherein an uppermost component of the upper portion of the piping network includes a pipe having a horizontally elongated transverse cross section, and the subsurface particulate material includes a lower layer gravel residing on the barrier and an upper layer of sand located thereabove.

23. The system of claim 14 and further comprising a display panel operatively connected to the controller and adapted to enable a user to see at least one of the following during operation: temperature and pressure at the output end of the positive displacement blower; the openness of the variably controllable valve; and the operating frequency of the positive displacement blower.

24. The system of claim 14 and further comprising:
the athletic field being an artificial turf having upstanding artificial grass-like fibers at least partially supported by the subsurface.

* * * * *